(No Model.)
D. HUNT, Jr. & W. R. McKEY.
Method of, and Apparatus for, Fastening Boxes.
No. 237,186. Patented Feb. 1, 1881.
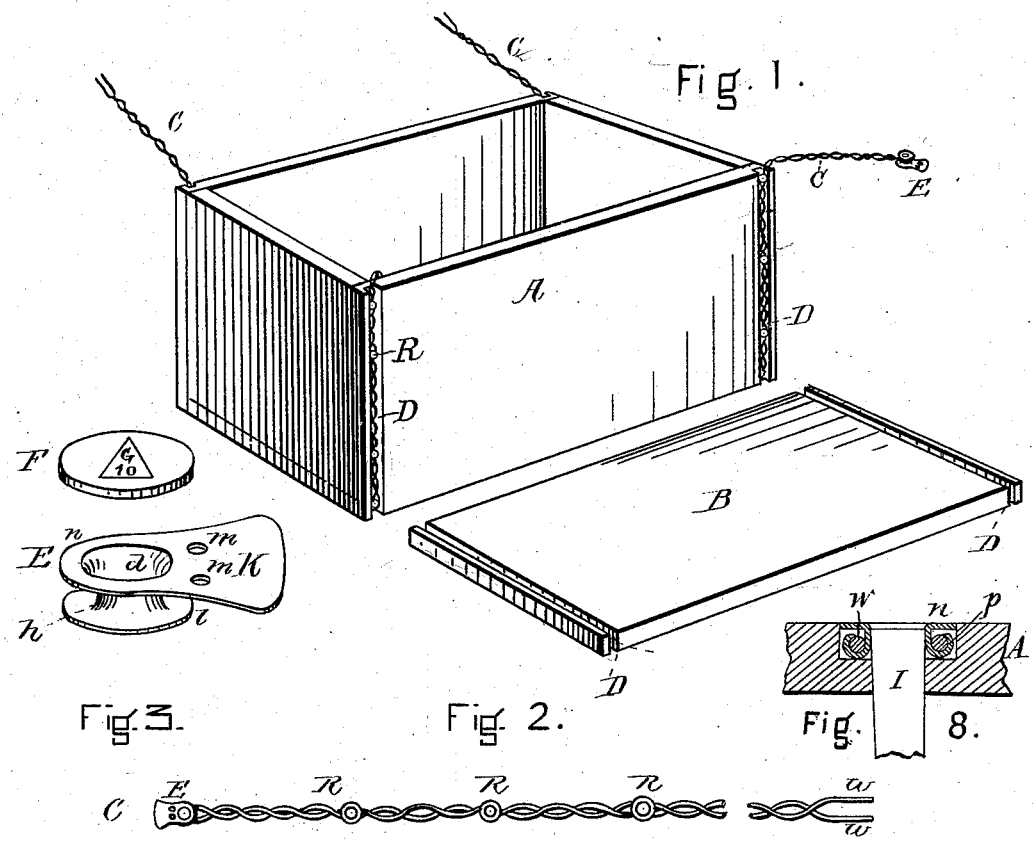
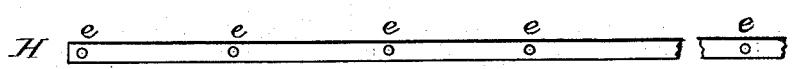
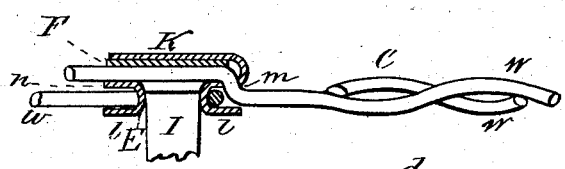
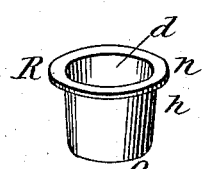
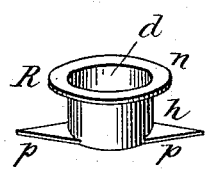
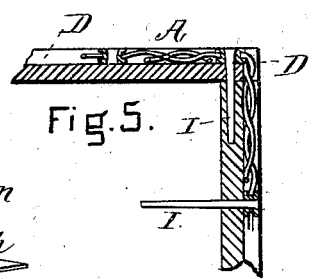
WITNESSES
E. L. Molineux.
H. I. Nash.
INVENTOR
David Hunt Jr.
Wm R. McKey
By Charles E. Pratt
Atty
N. PETERS, PHOTO-LITHOGRAPHER, WASHINGTON, D. C.

UNITED STATES PATENT OFFICE.

DAVID HUNT, JR., AND WILLIAM R. McKEY, OF BOSTON, MASSACHUSETTS.

METHOD OF AND APPARATUS FOR FASTENING BOXES.

SPECIFICATION forming part of Letters Patent No. 237,186, dated February 1, 1881.

Application filed September 3, 1880. (No model.)

*To all whom it may concern:*

Be it known that we, DAVID HUNT, Jr., and WILLIAM R. McKEY, both of Boston, in the county of Suffolk and State of Massachusetts, have invented certain new and useful Improvements in Methods of Fastening Boxes and Apparatus therefor, of which the following is a specification.

Heretofore the prevailing method of making and fastening packing-boxes for packing boots and shoes, and for other purposes, has been to make them plain six-sided ones, the sides and cover being fastened with nails or screws through the entire thickness of the material, and then to further secure the same by nailing or otherwise fastening hoops of wood or iron around them on the outside. This hooping or strapping the boxes is for two objects—first, to make them stronger, and, second, to make them secure from opening and abstraction of goods therefrom without immediate detection. There is great difficulty in inducing transportation companies to take boxes of goods which are not strapped, on this latter account, and even those strapped in the ordinary way are objectionable to them. The present modes of strapping are clumsy, expensive, and insecure; are of considerable thickness, of course, and so prevent close packing of boxes. They are easily torn off by the hooks with which they are handled. When made of wood they are easily split by driving nails, and so weakened, and are expensive in the matter of time required to put them on, and they are all, owing to their imperfections and the method of fastening, by simply lapping them over, insecure against tampering with them, and offer no means of detection when they are opened.

It is the object of our improvements to obviate all these difficulties, and to secure economy, readiness of application, strength, security from invasion, and ready means of detection in the method and means of fastening packing-boxes, and the nature of them will be apparent from the following description in connection with the drawings, in which—

Figure 1 shows, in perspective, a wooden box with the cover off, containing some of our improvements. Fig. 2 shows, in plan, at C one form of a hoop embodying some of our improvements, and at H an iron strap such as has been used heretofore. Fig. 3 shows our improved end eyelet in one form at E, and F a seal, both in perspective. Fig. 4 shows a section, in part, of hoop C, eyelet E, and seal F after it has been used. Fig. 5 shows, in section, one corner of the box A, with some of our improvements. Figs. 6 and 7 show, in perspective, other forms of our improved eyelet R. Fig. 8 shows a section through an eyelet, R, constructed as in Fig. 7, when used with a nail or screw, I, through it.

The box A may be composed, in the ordinary way, of four rectangular sides laid upon two rectangular ends, as shown in Fig. 1, of which one side, B, may be used as the cover, and may be made of wood; but instead of having straight plain sides, as we construct it, it has grooves D D cut across near each end of the cover, so that when the box is put together the groove D extends around the box and near the end, and, as we prefer to make it, so that the whole groove shall be within a distance from the end of the side less than the thickness of the end piece of the box. This groove may be cut at the same time that the stuff is sawed in lengths for the sides of the box, and without much additional expense.

C is a hook or strap made of two or more strands of wire, *w w*, twisted together, in which may be inserted at proper distances eyelets R R, and which constitutes one form of our improved hoop.

H is a strap or flat strip of iron or other metal, containing at proper distances holes *e e*, punched in it, such as has heretofore been used on the outside of packing-boxes for strapping.

E in Fig. 3 is one form of an improved end eyelet or clasp, which consists of a cylindrical barrel with flanges *u l*, as in the ordinary form, but which has one of these flanges extended and enlarged into a flange or clasp, K, as shown in Fig. 3. This flange K contains, near the barrel of the eyelet, holes *m m*, and is made large enough to turn over and nearly or quite cover, when used and in place, the eyelet.

F is a seal, which may be made of suitable paper, lined to make it tenacious, or, as we prefer to make it, of lead or other soft metal, and which may bear any trade-mark or other device for identification.

I is a nail or screw.

R is an intermediate eyelet, having the barrel h upon opening d, to receive a nail or screw and rim n, and may be made plain with a slight taper, as at o, so that it will, when the nail is driven, follow the nail into the wood; or, as we prefer to make it, it may have the points p p, which hold it in the hoop, and which, when driven, bend up about the wire, as shown in Fig. 8.

Our improved hoops may be made of two or more strands, as shown at C, which is the preferable way, and may be made in lengths, as desired, with the clasp end eyelet made on one end, as shown in Fig. 2; or they may be made of indefinite length of piece and cut to proper lengths, when we leave the strands separate and straight, as at w w in Fig. 2, at both ends. Where the hoops or bands are made in single lengths, the end eyelet, E, may be fastened thereto by bending the strands of the wire around the barrel of the eyelet and making it into the band. Otherwise the end eyelet is fastened to the band or hoop by bending the ends of the strands around the barrel, and weaving or tucking them into the twists, or by twisting the ends together beneath the band. When the stuff for the box is taken to put together, having the grooves D D therein, the hoop is laid in the groove and a nail or screw inserted and driven through each intermediate eyelet until the box is made, except at one side or the cover. Then the free ends of the hoops may be bent inward, and the cover lightly tacked in place. The boxes may then be handled and transported empty.

The advantage of making the barrel h of the intermediate eyelet below the rim n plain and slightly tapered to o, as in Fig. 6, is that the eyelet follows the nail into the wood; but in order to prevent this eyelet from slipping out of the hoop when handled before use we have two points, p p, thereon, which keep it in the hoop, and when the nail is driven these points bend upward more closely about the wire, as shown in Fig. 8.

When the box is filled and the cover laid in place the face ends of the hoop are brought down in the grooves and fastened as before, except that the free ends of the strands are drawn through the holes m m in the flange K of the end eyelet, E, and bent and crossed. Then a seal, F, is placed on the eyelet, after the nail or screw has been driven, and the flange K is bent over and fastened upon the seal and the eyelet and ends of the wire, holding all securely in place, as in Fig. 4. This security is not merely from unfastening or breaking by ordinary handling or strain, but also against tampering for abstraction, since a glance at the flange and seal will disclose whether it has been disturbed or not.

This method of fastening gives a more flexible hoop, and stronger, and brings it below or even with the outer surfaces of the box, so that several boxes can be more closely packed, and that in handling with hand-hooks the hoops will not be torn off.

It is obvious that the metal strap H may be used with grooves in the box in a similar way, and it is obvious that one or more grooves of similar form and purpose to D D may be made and used anywhere on the box.

We claim as new and of our invention—

1. As an article of manufacture, a six-sided wooden box having a circumferential groove around either end and at a distance from the end less than the thickness of the end piece, and containing in the grooves hoops or bands fastened through the sides and bottom in the grooves by the same nails or screws that hold these parts of the box to the ends, and having the ends of the bands or hoops left free to be fastened over and with the cover of the box in the grooves, when constructed and adapted to be used as a packing-box, substantially in the manner and for the purposes herein set forth.

2. A hook or strap, C, constructed of two or more strands of wire twisted together with eyelet insertions R R, substantially as and for the purposes set forth.

3. An eyelet or clasp, E, constructed with an opening, d, barrel h, flange K, and holes m m, substantially as shown and described.

4. The combination of a hoop or strap, C, with a clasp, E, and a seal, F, substantially in the manner and for the purposes set forth.

5. Combined in a hoop for fastening boxes, two or more wire strands, w w, twisted together, intermediate eyelets, R R, for receiving nails or screws, and an end eyelet or clasp, E, for joining the two ends of the strap and securing the same, substantially as set forth.

6. A packing-box constructed with a groove entirely around each end, with a hoop or band in each groove, fastenings through the hoops and sides into the end pieces, and so that the hoops and the pieces of the box are put together at the same time and held by the same means, and that the hoops and their fastenings shall not project without the exterior surfaces of the box, substantially as set forth.

DAVID HUNT, Jr.
WM. R. McKEY.

Witnesses:
HERMAN H. DUKER,
CHARLES E. PRATT.